July 21, 1953     H. A. FERRELL     2,646,303
TRACTOR BUMPER
Filed June 16, 1950
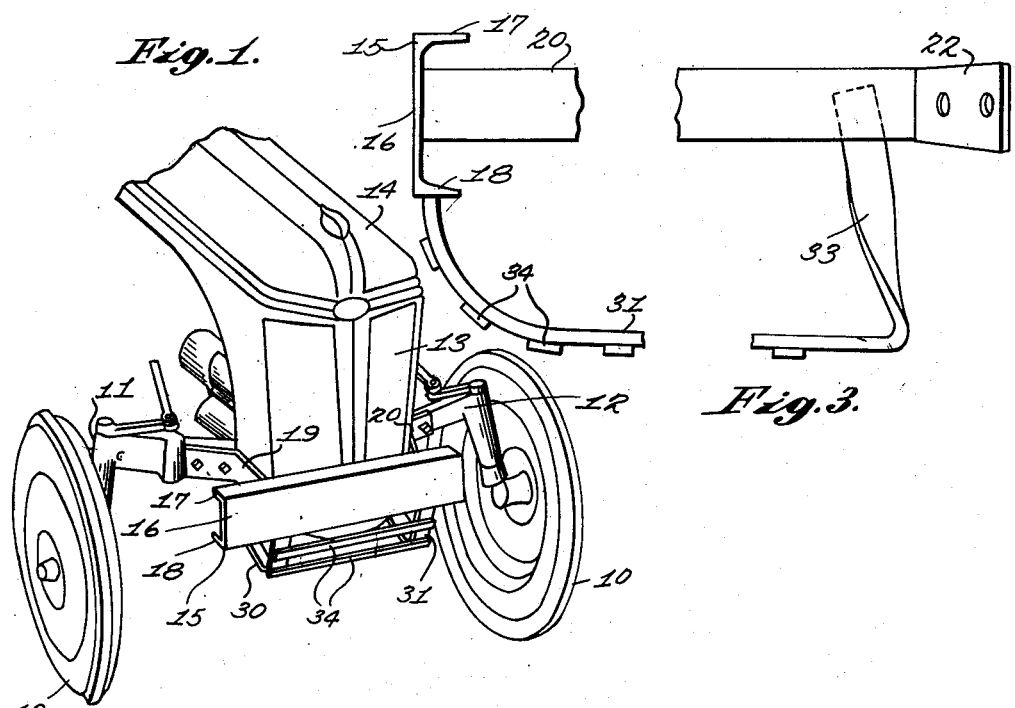
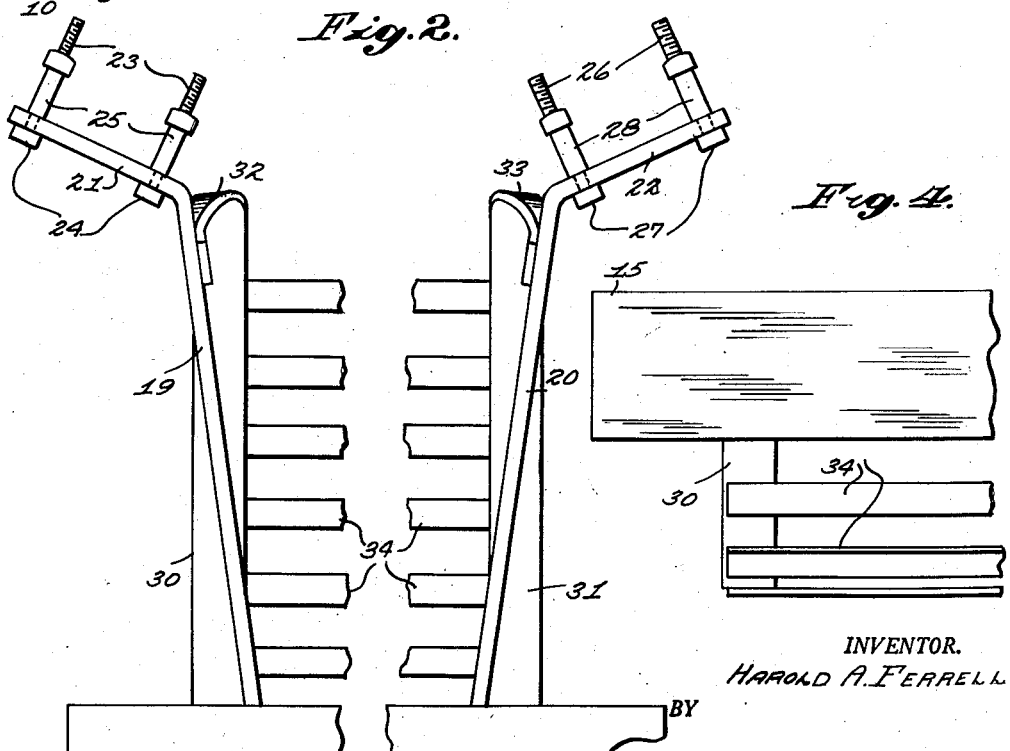
INVENTOR.
HAROLD A. FERRELL
BY
McMorrow, Berman + Davidson
ATTORNEYS

Patented July 21, 1953

2,646,303

UNITED STATES PATENT OFFICE 2,646,303

TRACTOR BUMPER

Harold A. Ferrell, Halifax, Va.

Application June 16, 1950, Serial No. 168,509

4 Claims. (Cl. 293—64)

This invention relates to tractor bumpers and more particularly to a front bumper for a tractor to protect the front end of the tractor and the tractor radiator against obstructions, such as stones, stumps, earth banks and brush.

It is among the objects of the invention to provide an improved tractor bumper assembly which can be applied to and removed from a tractor as a one piece unit, which is rigidly connected to the front axle structure of the tractor and, when applied, extends across and underneath the front end of the tractor to fully protect the lower portion of the entire front end of the tractor ahead of the front axle structure, which is of open work construction to provide a free flow of air to the tractor radiator, and which is strong, rigid and durable in construction, economical to manufacture, and easy to install on an existing tractor with no material modification of the tractor construction.

Other objects and advantages will become apparent from a consideration of the following description and the appended claims in conjunction with the accompanying drawing wherein:

Figure 1 is a perspective view of a fragmentary front end portion of a farm tractor with a bumper illustrative of the invention mounted thereon;

Figure 2 is a top plan view on an enlarged scale of the bumper assembly;

Figure 3 is a side elevation of the bumper assembly; and

Figure 4 is a front elevation of a fragmentary portion of the bumper assembly.

With continued reference to the drawing, the tractor illustrated is a well known type of farm tractor, the front end of which is supported on spaced apart front wheels 10 mounted on a front axle structure which comprises two arms 11 and 12 of right angle shape which are connected each at one end to the tractor frame at the front end and at respectively opposite sides of the frame and are inclined outwardly and rearwardly from the front end of the frame. Angularly disposed portions of these arms project downwardly relative to the tractor frame and the front wheels are journaled at the lower ends of the downwardly projecting portions of the arms 11 and 12. The arms 11 and 12 are rigidly secured to the tractor frame and provide a firm and rigid support for a front end tractor bumper.

A radiator is mounted on the tractor frame between and somewhat ahead of the arms 11 and 12 and is covered by a suitable grille 13 and hood 14. The radiator extends substantially to the bottom of the tractor frame and is subject to damage by obstacles, such as stones, stumps, brush and earth banks when the tractor is being used in rough terrain. Other components such as the engine cranking shaft and the radiator grille are exposed at the front end of the tractor and subjected to damage by obstacles such as those mentioned above.

The bumper assembly of the present invention protects the lower portion of the entire front end of the tractor ahead of the front axle structure against damage by various obstacles.

The bumper assembly comprises an elongated, straight bar 15 conveniently formed of a piece of channel iron of appropriate size and having a web portion 16 and two flanges 17 and 18 extending one along each longitudinal edge of the web and projecting substantially perpendicularly from the same side of the web in spaced apart and substantially parallel relationship to each other.

Two elongated bracket arms 19 and 20, preferably formed of heavy strap iron, are secured each at one end to the bar 15 near the respectively opposite ends of the bar and project almost at right angles from the same side of the bar.

As illustrated, the two bracket arms 19 and 20 are symmetrically disposed relative to a plane which perpendicularly bisects the web and both flanges of the channel bar 15 and diverge symmetrically from each other in a direction away from the bar with their longitudinal center lines disposed in a plane perpendicular to the first mentioned plane.

At its end remote from the bar 15 the bracket arm 19 has an angularly disposed portion 21 and the bracket arm 20 has at its corresponding end a similar angularly disposed portion 22. The portions 21 and 22 diverge away from each other more sharply than the remaining portions of the bar and are so arranged that when they are substantially parallel to the corresponding front axle arms 11 and 12 the bar 15 will be disposed in front of the tractor radiator grille 13 and substantially perpendicular to the longitudinal center line of the tractor frame.

Two elongated bolts 23 extend through apertures provided in the portion 21 of the bracket arm 19 at spaced apart locations along the portion 21 and have heads 24 bearing on the side of the portion 21 adjacent the bar 15. Spacer sleeves 25 are mounted one on each of the bolts 23 and the portions of the bolts projecting from the ends of the spacer sleeves 25 remote from the bracket arm portion 21 are received in apertures provided in the axle arm 11.

Two bolts 26, similar to the bolts 23, extend through spaced apart apertures in the angularly disposed portion 22 of the bracket arm 20 and have heads 27 which bear on the side of the portion 22 adjacent the bar 15. Spacer sleeves 28 respectively surround the bolts 26 at the side of the bracket arm portion 22 remote from the bar 15 and the bolts 26 are received in apertures provided in the front axle arm 12 of the tractor.

Nuts, not illustrated, are threaded onto the bolts 23 and 26 at the rear sides of the front axle arms 11 and 12 to rigidly secure the bumper assembly to the front axle structure of the tractor.

Two runner shaped braces 30 and 31, also preferably formed of heavy strap iron, are secured each at one end to the bar 15 at the hollow side of the bar and project substantially perpendicularly from this side of the bar in spaced apart and substantially parallel relationship to each other. The brace 30 has at its end remote from the bar 15 a substantially perpendicularly disposed portion 32, the end of which is rigidly secured to the bracket arm 19 near the proximal end of the angularly disposed portion 21 and the brace 31 has at its end remote from the bar 15 a similar angularly disposed portion 33 the distal end of which is secured to the bracket arm 20 near the proximal end of the angularly disposed portion 22 of this bracket arm.

When the bumper assembly is mounted in operative position on the tractor, as illustrated in Figure 1, the brace 30 is disposed below and substantially parallel to the bracket arm 19 and the brace 31 is disposed below and substantially parallel to the bracket arm 20, the bar 15, the bracket arms 19 and 20 and the braces 30 and 31 being substantially horizontally disposed with the two braces extending below the bracket arms. The end portions of the braces 30 and 31 adjacent the bar 15 are curved downwardly and rearwardly from the bar to provide runner like structures immediately below the bumper bar.

Slats 34, preferably formed of strap iron of lighter weight than the strap iron of which the braces 30 and 31 are formed, extend across the space between the two braces 30 and 31 in spaced apart and substantially parallel relationship to each other and to said bar, and are connected at their respectively opposite ends to the sides of the braces remote from the bracket arms 19 and 20. These slats extend along the braces from a location adjacent the normally lower edge of the bumper bar 15 to a location near the normally rearward ends of the two braces and effectively prevent bushes, stumps or similar obstacles from reaching the radiator grille or the radiator of the tractor and, because of the runner shaped construction of the braces 30 and 31 will tend to raise the front end of the tractor if a large rock or stump is encountered. The bumper bar 15 protects the front end of the tractor against larger obstacles, such as high stumps, trees or large rocks and may also be used as a pushing element if it is desired to push an object or vehicle by the tractor.

The invention may be embodied in other specific forms without departing from the spirit or essential characteristics thereof. The present embodiment is, therefore, to be conisdered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a tractor having a front axle and a grille structure extending above and below said front axle adjacent thereto, a bumper and grille protector comprising an elongated bumper bar disposed in substantially horizontal position in front of said grille structure and substantially at right angles to the longitudinal center line of said tractor, elongated bracket arms secured to said bumper bar one near each end of the bumper bar, each of said bracket arms being secured at one end to said bumper bar and projecting from the same side thereof substantially symmetrically of a plane perpendicularly bisecting said bumper bar, fasteners connecting said bracket arms at their ends remote from said bumper bar to said front axle, runner shaped braces disposed respectively below said bracket arms and each secured at its front end to said bumper bar and at its rear end to the corresponding bracket arm at a location spaced rearwardly along the corresponding bracket arm from said bumper bar, and slats extending across the space between said braces in spaced apart relationship to each other and secured at their respectively opposite ends to said braces.

2. In combination with a tractor having a front axle and a grille structure extending above and below said front axle adjacent thereto, a bumper and grille protector comprising an elongated bumper bar disposed in substantially horizontal position in front of said grille structure and substantially at right angles to the longitudinal center line of said tractor, elongated bracket arms secured to said bumper bar one near each end of the bumper bar, each of said bracket arms being secured at one end to said bumper bar and projecting from the same side thereof substantially symmetrically of a plane perpendicularly bisecting said bumper bar, fasteners connecting said bracket arms at their ends remote from said bumper bar to said front axle, runner shaped braces disposed one below each of said bracket arms and each secured at its front end to said bumper bar and at its rear end to the corresponding bracket arm at a location spaced rearwardly along the corresponding bracket arm from said bumper bar, and spaced apart slats extending across the space between said braces in substantially parallel relationship to each other and to said bumper bar and secured at their respectively opposite ends to said braces.

3. In combination with a tractor having a front axle and a grille structure extending above and below said front axle, a bumper and grille protector comprising an elongated bumper bar disposed in substantially horizontal position in front of said grille structure and substantially perpendicular to the longitudinal center line of said tractor, elongated bracket arms projecting from the same side of said bumper bar at locations spaced apart along said bumper bar, each of said bracket arms being secured at one end to said bumper bar and having its end portion remote from said bumper bar angularly disposed in a direction such that the angularly disposed end portions of said bracket arms diverge in a direction away from said bumper bar, bolts extending through the angularly disposed portions of said bracket arms and through said front axle, spacing means on said bolts maintaining the angularly disposed end portions of said bracket arms spaced a predetermined distance from the adjacent portions of said front axle, runner shaped braces disposed respectively under said bracket arms and each secured at its front end to said bumper bar and at its rear end to the corresponding bracket arm at a location spaced rearwardly along the corresponding bracket arm from said bumper bar, and slats extending between and secured at their opposite ends to said braces.

4. In combination with a tractor having a front axle and a grille structure extending above and below said front axle adjacent thereto, a bumper and grille protector comprising an elongated bumper bar disposed in substantially horizontal position in front of said grille structure and substantially at right angles to the longitudinal center line of said tractor, elongated bracket arms secured to said bumper bar at locations spaced apart along said bumper bar, each of said bracket arms being secured at one end to said bumper bar and projecting from the same side thereof substantially symmetrically of a plane perpendicularly bisecting said bumper bar, fasteners connecting said bracket arms at their ends remote from said bumper bar to said front axle, runner shaped braces disposed one below each of said bracket arms substantially perpendicular to said bumper bar and having downwardly and rearwardly curved front ends secured to said bumper bar and their rear ends secured to the corresponding bracket arms at locations spaced rearwardly from said bumper bar, and slats extending across the space between said braces and secured at their respectively opposite ends to said braces.

HAROLD A. FERRELL.

References Cited in the file of this patent

UNITED STATES PATENTS

| Number | Name | Date |
|---|---|---|
| 2,288,978 | Talley | July 7, 1942 |
| 2,399,810 | Ketcham | May 7, 1946 |
| 2,551,322 | Ford | May 1, 1951 |